United States Patent
Yamashita et al.

(10) Patent No.: US 6,536,834 B2
(45) Date of Patent: Mar. 25, 2003

(54) DOOR WEATHER STRIP WITH SEAL LIPS ATTACHED THERETO

(75) Inventors: Takashi Yamashita, Hiroshima (JP); Masaki Soda, Wako (JP)

(73) Assignees: Nishikawa Rubber Co., Ltd., Hiroshima (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/963,307

(22) Filed: Sep. 26, 2001

(65) Prior Publication Data

US 2002/0038964 A1 Apr. 4, 2002

(30) Foreign Application Priority Data

Sep. 28, 2000  (JP) ........................................ 2000-296417

(51) Int. Cl.⁷ .................................................. B60J 10/08
(52) U.S. Cl. .................................... 296/146.9; 49/479.1
(58) Field of Search ............................. 296/146.9, 206; 49/479.1, 500.1, 489.1

(56) References Cited

U.S. PATENT DOCUMENTS 5,269,101 A    12/1993  Nozaki et al.
6,189,951 B1 *  2/2001  Deguchi .................. 296/146.9

FOREIGN PATENT DOCUMENTS

| EP | 0 435 685 | 7/1991 | |
| JP | 405310040 | * 11/1993 | ............ 296/190.11 |
| JP | 08-198032 | 8/1996 | |
| JP | 08-310250 | 11/1996 | |
| JP | 11-240394 | 9/1999 | |

OTHER PUBLICATIONS

Search Report dated Mar. 19, 2002, as issued by the U.K. Patent Office in corresponding U.K. Application No. GB 0123282.6.

* cited by examiner

Primary Examiner—Joseph D. Pape
(74) Attorney, Agent, or Firm—Flynn, Thiel, Boutell & Tanis, P.C.

(57) ABSTRACT

A door weather strip with seal lips attached thereto, fitted to a door sash, and provided with a gap of a given magnitude on a vertical plane between edges of respective seal lips of both an extrusion molded part on the side of a roof and an extrusion molded part on the side of a center pillar, a reinforcing rib is provided over the whole length of a seal lip of a molded part, which connects the extrusion molded parts with each other to form a corner section. The reinforcing rib is located on the interior side of an automobile where no elastic contacts with a body panel is being made, thereby preventing the waving from occurring to the molded part.

12 Claims, 3 Drawing Sheets

DOOR WEATHER STRIP WITH SEAL LIPS ATTACHED THERETO

BACKGROUND OF THE INVENTION

1. Field of the Invention

The present invention relates to a door weather strip with seal lips attached thereto, fitted to a door sash of an automobile, comprising the seal lips which are kept in elastic contact with a body panel.

2. Description of the Related Art

Referring to FIGS. 1 to 3, description is given hereinafter. There has so far been available a door sash 40 of an automobile, fitted with door weather strips 20 with a hollow seal part attached thereto, each comprising the hollow seal part 21 kept in elastic contact with a body panel 30, and a door weather strip 50 with seal lips attached thereto, formed separately from the door weather strips 20, and comprising the seal lips 51 kept in elastic contact with the external edge face of the body panel 30. With the door weather strip 50, an extrusion molded part 53 on the side of a roof 31 is connected with an extrusion molded part 53 on the side of a center pillar 32 through the intermediary of a molded part 52 forming a corner section.

With the conventional door weather strip 50 with the seal lips attached thereto, there is a case where a gap 60 is provided between edges of the respective seal lips 51 of both the extrusion molded part 53 on the side of the roof 31 and the extrusion molded part 53 on the side of the center pillar 32, as shown in FIG. 3.

However, if the gap 60 wider than a given magnitude (normally, the gap 60 wider than about 2 mm) is provided between the edges of both the seal lips 51, this will cause a problem that, upon closing the door of the automobile, a follow-up characteristic of the seal lips 51 against the body panel 30 becomes less cooperative and so-called waving 70 is caused to occur mainly in the bent part of the molded part (the corner section) 52, thereby resulting in poorer sealing characteristics, and impairing external appearance in aesthetic terms.

Thus, there is a need for solving a problem with the door weather strip 50 with seal lips attached thereto, comprising the conventional seal lips 51, that in case the gap 60 wider than a given magnitude is provided on a vertical plane between the edges of the respective seal lips 51 of both the extrusion molded part 53 on the side of the roof 31 and the extrusion molded part 53 on the side of the center pillar 32, the waving 70 is caused to occur mainly in the bent part of the molded part (the corner section) 52, thereby causing both the sealing characteristics and the external appearance in aesthetic terms to deteriorate.

SUMMARY OF THE INVENTION

With reference to FIGS. 1, 4, and 5, description is given hereinafter. The present invention provides a door weather strip 10 with seal lips attached thereto, fitted to a door sash 40, and provided with a gap 60 of a given magnitude on a vertical plane between edges of respective seal lips 11 of both an extrusion molded part 13 on the side of a roof 31 and an extrusion molded part 13 on the side of a center pillar 32. A reinforcing rib 14 is provided along the whole length of a seal lip 11 of a molded part 12, which connects the extrusion molded parts 13, 13 and forms a corner section, on the interior side of an automobile where no elastic contacts with a body panel 30 is being made, thereby preventing waving 70 from occurring to the molded part 12.

DESCRIPTION OF THE PREFERRED EMBODIMENTS

Figure 1:
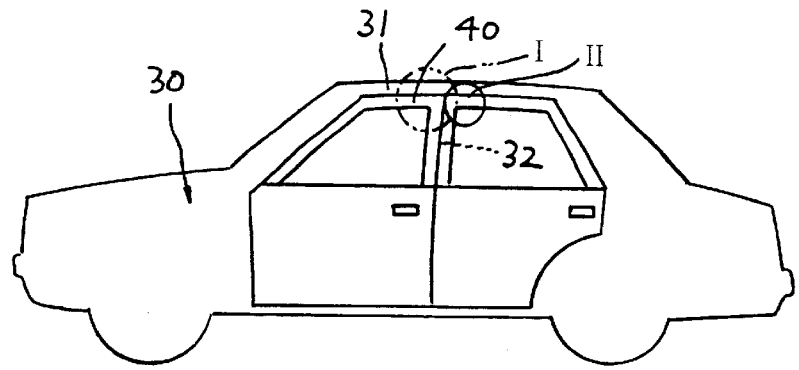
FIG. 1 is a side view showing an automobile provided with a door weather strip with seal lips attached thereto.
Figure 2:
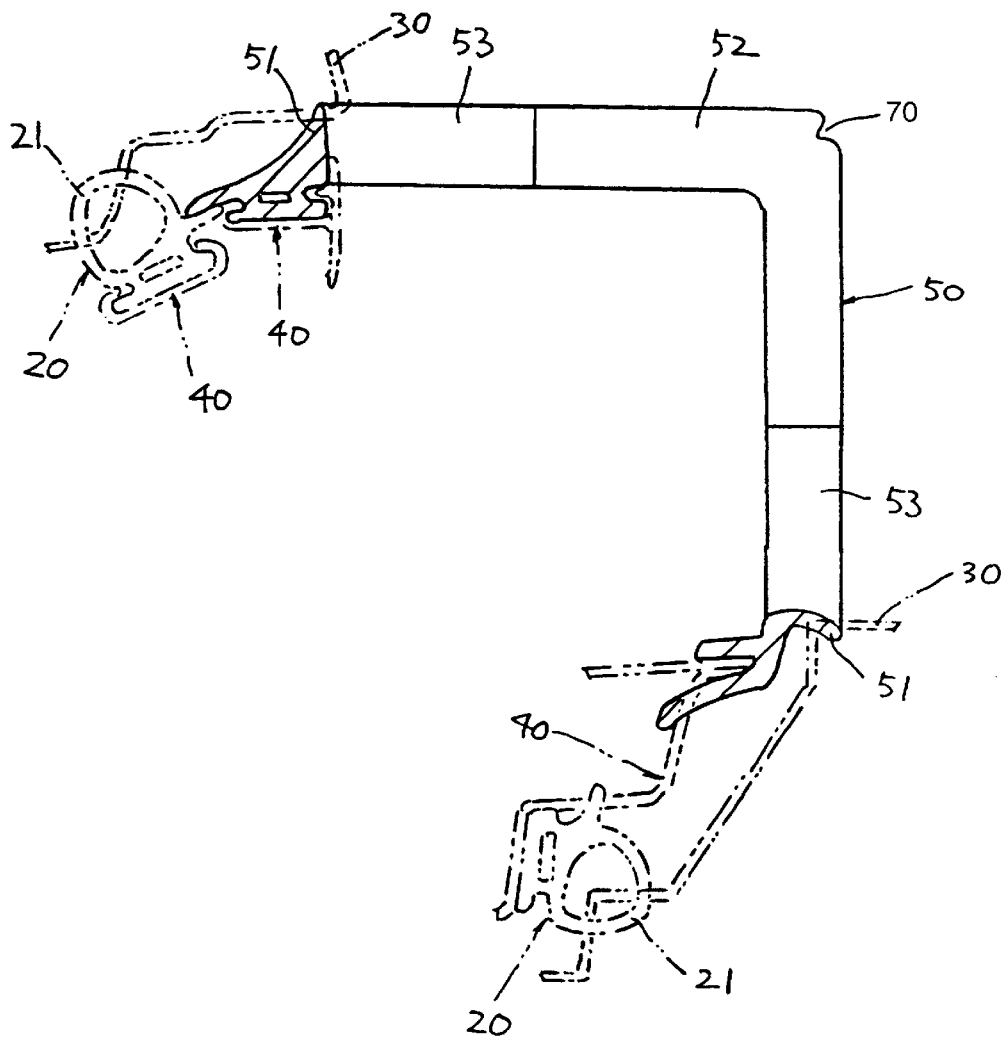
FIG. 2 is a side view (sectional view) of a conventional door weather strip with seal lips attached thereto, showing a portion I thereof in FIG. 1.
Figure 3:
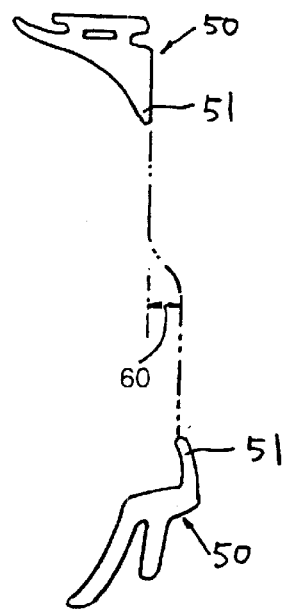
FIG. 3 is a schematic illustration showing a gap 60 as seen on a vertical plane, provided between edges of respective seal lips.
Figure 4:
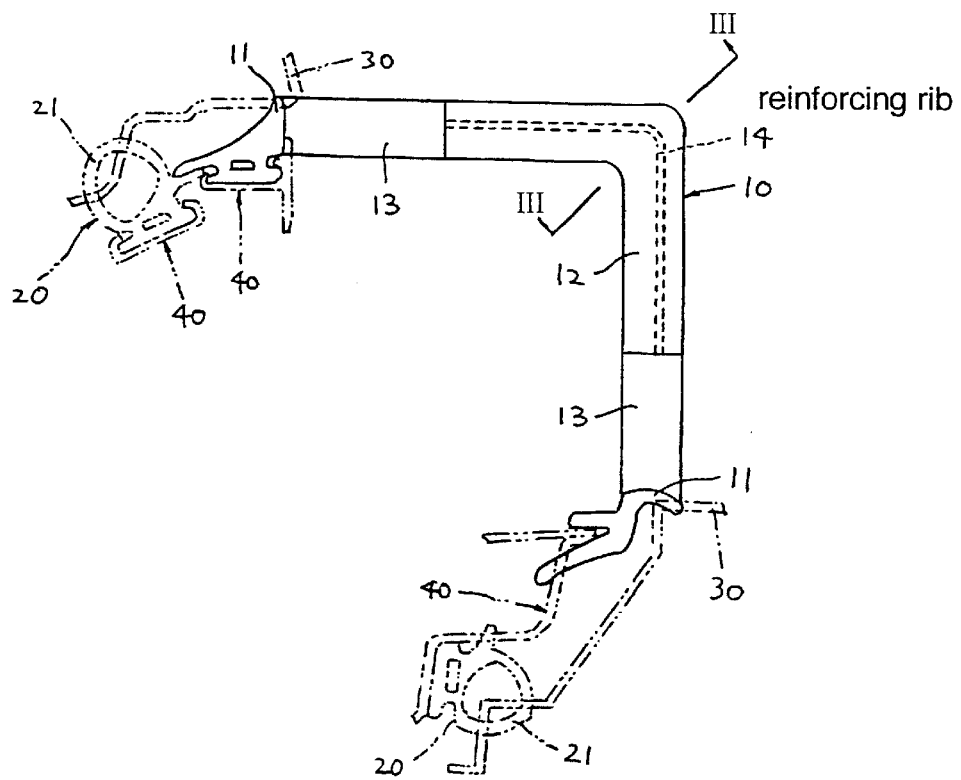
FIG. 4 is a side view (sectional view) of a door weather strip with seal lips attached thereto according to the invention.
Figure 5:
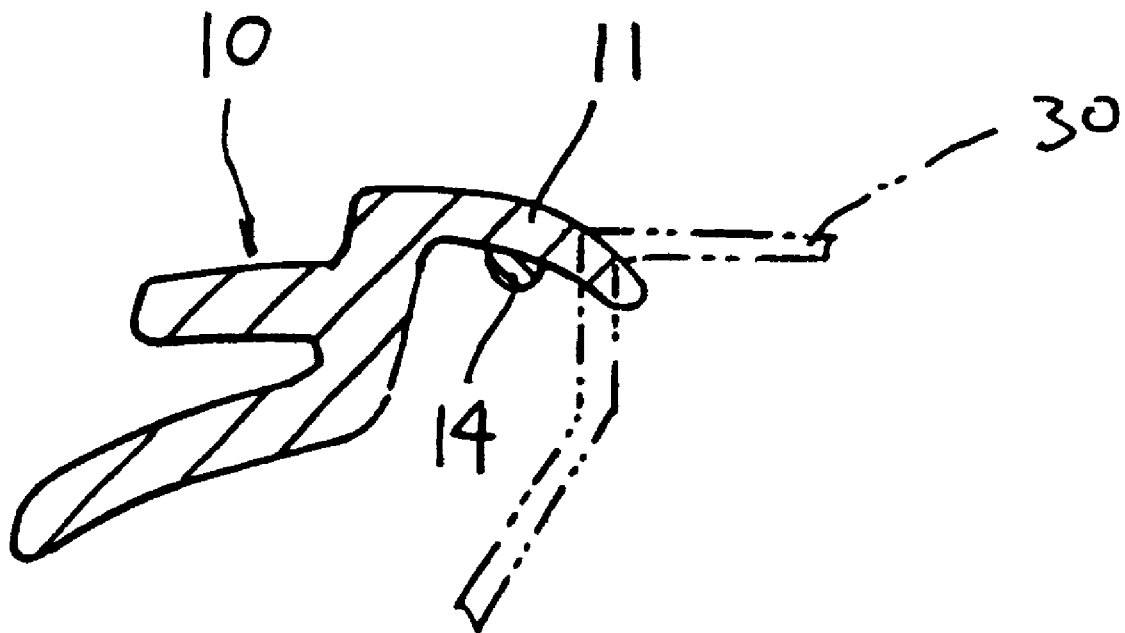
FIG. 5 is a cross-sectional view taken on line III—III of FIG. 4

FIGS. 1, 4, and 5 show an embodiment of a door weather strip 10 with seal lips attached thereto according to the invention. The door weather strip 10 is fitted to a door sash 40, together with, but separately from door weather strips 20 with a hollow seal part attached thereto, and there is provided a gap 60 of a given magnitude as seen on a vertical plane between edges of respective seal lips 11 of both an extrusion molded part 13 of the door weather strip 10, on the side of a roof 31, and an extrusion molded part 13 thereof, on the side of a center pillar 32.

In the door weather strip 10, a reinforcing rib 14 is provided over the whole length of a seal lip 11 of a molded part 12. The molded part 12 connects the extrusion molded part 13 of the roof 31 side and the extrusion molded part 13 of the center pillar 32 side to form a corner section. The reinforcing rib 14 is provided to the seal lip 11 at the interior side of an automobile where no elastic contacts with a body panel 30 is being made. Such structure prevents a waving to grow in the corner section. The reinforcing rib 14 is formed of the same class of material as material used for the molded part 12, and integrally therewith at the same time when the molded part 12 is formed.

Now, the function of the door weather strip 10 will be described hereinafter. Since the door weather strip 10 is provided with the reinforcing rib 14 over the whole length of the seal lip 11 of the molded part 12, in a portion thereof, on the interior side of the automobile where no direct elastic contact with the body panel 30 is being made, structural strength of the seal lip 11 in the molded part 12 can be enhanced.

As a result, even if a force to cause the waving 70 to occur to the seal lip 11 of the molded part 12 acts due to presence of the gap 60 at the time of closing the door, such a force is absorbed by the agency of the reinforcing rib 14. Accordingly, the waving 70 does not occur to the seal lip 11, so that the seal lip 11 over the whole length thereof is kept in elastic contact with the body panel 30, and thereby both a sealing characteristic and an external appearance in aesthetic terms can be maintained in good condition.

Further, the door sash 40 on the side of the center pillar 32, shown in the present embodiment, has a particular structure, however, the door weather strip with seal lips attached thereto according to the invention can be fitted to a door sash having the same structure as that for the door sash on the side of the roof 31. Furthermore, the present embodiment of the invention is also applicable to a part designated II of a rear door, as shown in FIG. 1.

Thus, because the door weather strip 10 with the seal lips attached thereto according to the invention is provided with the reinforcing rib 14 over the whole length of the seal lip 11, in the portion thereof, on the interior side of the automobile where no elastic contacts with the body panel 30 is being made, the structural strength of the seal lip 11 in the molded part 12 can be enhanced. Consequently, the waving 70 does not occur to the seal lip 11, so that the sealing characteristic and the external appearance in aesthetic terms can be maintained in good condition.

What is claimed is:

1. A combination of:
  a vehicle having a body panel, a roof and center pillar;
  a door having a door sash;
  a door weather strip with seal lips attached thereto, fitted to said door sash, and provided with a gap of a given magnitude on a vertical plane between edges of the respective seal lips of both an extrusion molded part corresponding to a side of the roof and an extrusion molded part corresponding to a side of the center pillar; and
  a reinforcing rib secured along an entire length of the seal lips of the molded parts,
  the extrusion molded part corresponding to the side of the roof joined to the extrusion molded part corresponding to the side of the center pillar to form a corner section,
  wherein said reinforcing rib is provided on the seal lips at an interior side of the vehicle where no direct elastic contact with the body panel is made, said reinforcing rib preventing waving from occurring to the molded parts.

2. The combination of claim 1, wherein said reinforcing rib is integrally molded with and formed from the same material as the molded parts and said molded parts are integrally molded together and formed from the same material.

3. A combination of:
  a body panel, roof, and center pillar of a vehicle;
  a door weather strip with seal lips attached thereto;
  a door sash receiving said weather strip, said seal lips having a gap of a given magnitude on a vertical plane at edges of the respective seal lips;
  an extrusion molded part corresponding to the side of the roof and an extrusion molded part corresponding to the side of the center pillar, the extrusion molded parts being joined to form a corner section; and
  a reinforcing rib provided along the length of the extrusion molded parts, the reinforcing rib forming an angle corresponding to the corner section formed by the extrusion molded parts, said reinforcing rib being provided along a length of the respective molded parts at a side to avoid direct elastic contact with the body panel of the vehicle,
  wherein the reinforcing rib prevents waving from occurring at the corner section formed by the molded parts.

4. The combination of claim 3, wherein the gap between the sealing lips is capable of providing a force when a door is closed that forms a wave in the molded parts at the corner section, the reinforcing rib absorbing the force to maintain the sealing function and the appearance of the sealing strip.

5. The combination of claim 3, wherein said extrusion molded parts forming the corner section and said reinforcing rib are integrally molded to each other with the same material.

6. The combination of claim 3, wherein said reinforcing rib is monolithic with the molded parts.

7. A combination of:
  a roof and center pillar for a vehicle;
  a weather strip including an extrusion molded part corresponding to a side of the roof and an extrusion molded part corresponding to a side of the center pillar, the extrusion molded parts being integrally secured to form a corner section, said weather strip including a first seal lip secured to said extrusion molded part corresponding to the side of the roof and extending along the length of the roof and a second seal lip secured to said extrusion molded part corresponding to the side of the center pillar and extending along the length of the center pillar;
  a door having a door sash receiving said weather strip; and
  a reinforcing rib provided along the entire length of the seal lips of said extrusion molded parts, said reinforcing rib extending about an angle corresponding to the corner section formed by the extrusion molded parts, said reinforcing rib being located on a side of said seal lips that avoids contact with a body panel of an automobile.

8. The combination of claim 7, wherein the reinforcing rib prevents waving from occurring at the corner section of the weather strip.

9. The combination of claim 7, wherein a gap formed between the first and second sealing lips when a door is closed causes a force that is capable of waving the seal lip of the molded part at the corner section, and wherein the force is absorbed by said reinforcing rib to maintain the sealing function and the appearance of said sealing strip.

10. The combination of claim 9, wherein said weather strip comprises a first weather strip and said seal lips comprise first and second seal lips,
  the combination including a second weather strip having a second hollow seal part, said second weather strip being secured to the door sash.

11. The combination of claim 9, wherein said reinforcing rib, said seal lips and said molded parts are molded together with the same material to form a monolithic element.

12. The combination of claim 7, wherein said reinforcing rib, seal lips and molded parts are molded together with the same material to form a monolithic element.

* * * * *